May 25, 1937.　　　　B. HOPPER　　　　2,081,300
PROCESS AND APPARATUS FOR SEPARATING OIL FROM WAX CAKES
Filed April 2, 1934
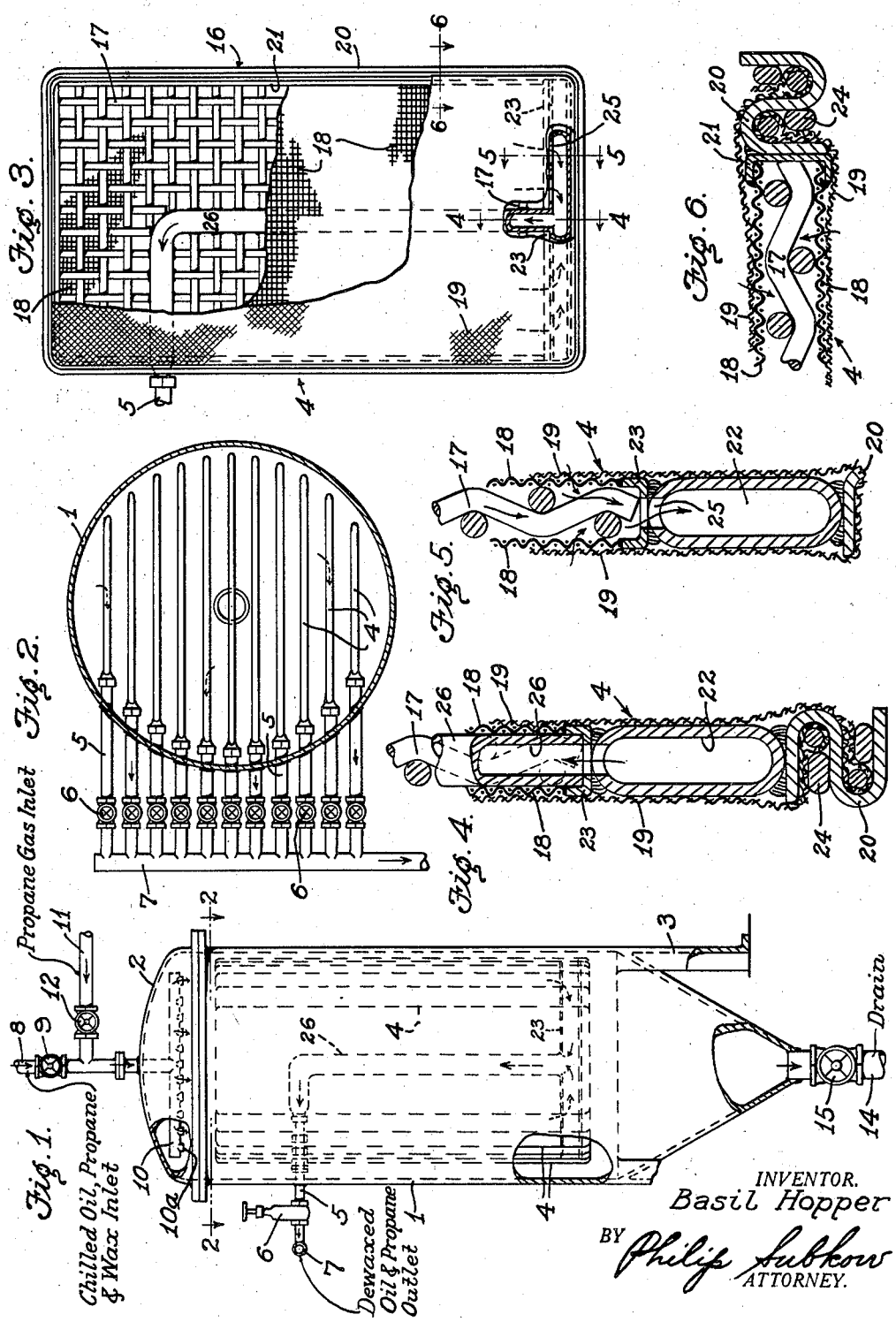
INVENTOR.
Basil Hopper
BY Philip Subkow
ATTORNEY.

Patented May 25, 1937

2,081,300

UNITED STATES PATENT OFFICE 2,081,300

PROCESS AND APPARATUS FOR SEPARATING OIL FROM WAX CAKES

Basil Hopper, San Pedro, Calif., assignor to Union Oil Company of California, Los Angeles, Calif., a corporation of California Application April 2, 1934, Serial No. 718,609

7 Claims. (Cl. 210—182)

The present invention relates to a process and apparatus for separating wax from oil. More specifically, it relates to a process for recovering oil and solvent entrained in wax cakes.

In recent years, processes have been developed for separating wax from oils wherein the wax containing oil is first diluted with a solvent of low specific gravity in order to reduce the viscosity of the waxy oil and to permit crystallized wax to be more readily separated from the waxy oil. The solution of waxy oil and solvent is then chilled to a low temperature in order to permit the wax to precipitate from solution. The chilled mixture of oil, solvent and precipitated wax is then passed through a filter in which the precipitated wax is separated from the oil and solvent or the precipitated wax may be separated by cold settling or centrifuging. The solvent is then removed from the dewaxed oil by distillation. In more recent years, oils have been dewaxed by dissolving them in a light liquid hydrocarbon, preferably a normally gaseous diluent such as liquid propane and the chilling has been accomplished by vaporizing a portion of the solvent under reduced pressure. By employing propane under pressure as the diluent and refrigerant, temperatures of approximately −40° F. may be obtained by gradually releasing the pressure to effect vaporization of a portion of the propane. At such temperatures substantially all of the wax will precipitate from solution. The chilled mixture is then passed through a filtering unit containing a plurality of filter leaves wherein the oil and solvent will pass through the filter leaves into a central chamber from which it is withdrawn while the wax will accumulate as a wax cake upon the outer cloth of the filter leaves. When a sufficient quantity of wax has accumulated upon the filter leaves, the filtration of further quantities of oil is discontinued and the filter chamber is then drained of oil, wax and solvent.

It has been known to then place from 10 to 20 lbs. per square inch propane pressure on the filter shell and blow propane-gas through the leaves to recover the propane-oil mixture with which the wax cake is wet. In other words, the filtration of the mixture of oil, propane and precipitated wax does not result in a complete separation of oil and propane from the wax. A substantial amount of propane and oil will be contained in the wax cakes clinging to the filter leaves. Consequently, by blowing propane gas through the wax cake, a portion of the adsorbed oil and propane will be separated from the wax cake. The present invention relates to an improvement in this blowing procedure to separate entrained oil and propane in the wax cake.

I have discovered that more effective results, i. e. better and more complete separation of the oil and propane from the wax cakes may be obtained if the blowing procedure is accompanied with a partial washing of the wax cakes. The pressures heretofore employed for blowing propane gas through the wax cakes have been insufficient to obtain a partial washing with liquid propane of the wax cakes.

I have discovered that if the blowing with the propane gas is started at the low pressures normally used, i. e. 10 to 20 lbs. per square inch and continued for several minutes and then the pressure gradually increased to values of 50 to 100 lbs. per square inch and continued for a length of time necessary to give the maximum degree of washing which usually requires from 10 to 15 minutes that improved results may be obtained. By operating in this manner, I have reduced the oil content in the recovered wax cake approximately 50 to 75%. By operating according to the known processes, the wax cake will contain approximately 50% oil. I have reduced this oil content to 15 to 25% which represents a substantial improvement over the former process. When placing the high propane gas pressure in the filter shell, liquid propane condenses on the cake and not only gives the blowing effect normally obtained but also a partial washing with liquid propane. With the lower blowing pressure heretofore mentioned, insufficient propane is condensed to give appreciable washing. On the other hand, it is quite necessary to start the blowing at the low pressures and then gradually raise the pressure to the higher values in order to obtain both the blowing and the washing effect. If the blowing is started at the high pressure, sufficient propane is condensed on the wax cake to slough or wash the wax cake from the filter leaves and as a result no washing or blowing effect can be obtained, whereas if the first low pressure blowing is resorted to, the cake will be partially dried so that when the higher pressure operations are resorted to with a resulting liquid washing of the wax cake, the higher pressure operation will not slough off appreciable quantities of wax from the filter leaves.

It is, therefore, an object of my invention to provide a process for separating oil and solvent from wax cakes containing the same.

Before describing the method for separating the oil and solvent from the filter cakes, it is preferable to obtain an idea of the structure of the filter as shown in the drawing. The filtering unit comprises a vertical cylindrical filter tank or shell 1 which is provided with a tightly fitted removable cover 2 and skirts 3 for supporting the tank. Suspended in the body of the vertical cylindrical shell are a plurality of filter leaves 4. Each filter leaf is connected to an outlet 5 provided with a valve 6 and each of the outlets are connected to a discharge manifold 7. The filter shell is provided at the top with line 8 and valve 9 which connects to a spray head or spider 10 disposed over the filter leaves and which is provided with a plurality of openings 10a. The openings 10a are preferably between filter leaves so that a spray of material may fall between the filtering elements for the purpose hereinafter described. Spray head 10 is employed for introducing the mixture of chilled oil, solvent and precipitated wax. Line 11 controlled by valve 12 is for the purpose of introducing a condensable gas into the filter shell as will hereinafter be described. The lower portion of the filter shell is preferably conical and is provided with a drain 14 controlled by valve 15.

Referring to Fig. 3, the filter leaf may consist of a peripheral frame 16 secured to a coarse screen 17 which holds the filter elements apart and permits the filtrate to drain into a receiver as will be hereinafter described. On each side of the coarse screen 17 are provided finer metal screens 18 which are provided for supporting filter elements 19 on the outer sides of the finer screens. The filter elements are usually of canvas cloth but may be of other suitable material. The peripheral frame 16 is preferably built up of a bar of S-shaped cross-section 20 which is welded to the channel bar 21 on all sides except at the bottom in which case it is welded to filtrate collector 22. The filtrate collector is preferably welded on its upper end to a channel bar 23. The coarse screen 17 is welded to the channel bars 21 and 23. The finer screen 18 is also welded to the channel bars. The filter element 19 is secured to the filter leaf by disposing the ends in the grooves of the S-bar and weaving therein sash cord or cotton rope 24 as shown in Figs. 4 and 6.

Another object of the invention resides in separating oil and solvent from wax cakes by blowing a condensable gas through said wax cakes under such conditions as to obtain a partial drying of the wax cakes followed by partial washing of the wax cakes without sloughing off appreciable quantities of wax from the wax cake adhered to the filter leaves.

A further object of the invention resides in blowing the wax cakes containing oil and solvent with a hydrocarbon gas at low pressures to partially dry the wax cakes and then gradually increasing the pressure to higher pressure levels to effect condensation of a portion of the hydrocarbon gas on the wax cakes and a partial washing thereof.

Another object of the invention is to dispose spray nozzles for introducing the chilled mixture of oil, propane and precipitated wax over the filter leaves in such manner that wax accumulating between filter leaves which does not drop to the bottom of the filter shell by flapping of the filtering elements will be washed to the bottom of the filter shell when the chilled mixture is introduced into the filter shell.

Various other objects and features of my invention will be apparent to those skilled in the art by the following description of the invention taken from the drawing in which:

Fig. 1 represents an elevation of the wax separating filter;

Fig. 2 is a cross-sectional plan of the filter taken through lines 2—2 of Fig. 1 and showing a plurality of filter leaves connected to the oil and solvent discharge pipes which are connected to a manifold;

Fig. 3 represents an elevation of a filter leaf with parts broken away to show two screens, a filter element and the oil and solvent discharge pipe;

Figs. 4, 5, and 6 are sections of a part of the filter leaf taken respectively on lines 4—4, 5—5, 6—6 of Fig. 3.

At the base of the filter leaf there is provided a filtrate collector pipe 22 which comprises a flattened pipe and which receives the filtrate through openings 25. The filtrate collector is connected to a communicating vertical discharge pipe 26 which is secured to the coarse screen and which connects with the discharge pipe 5 and manifold 7.

In operation, valves 12 and 15 are closed and valve 9 opened to permit introduction of chilled oil, solvent and precipitated wax into the filter chamber. The chilled mixture is preferably obtained by commingling the wax containing oil with a diluent, preferably commercial propane, under pressure of say 165 lbs. gauge or sufficient to maintain the solvent liquid. While we prefer to use commercial propane as a combined diluent and refrigerant, it will be observed that other normally gaseous hydrocarbons, such as butane, isobutane, butylene, ethane, ethylene, propane, propylene, etc. may be used either separately or in admixture with each other. The oil dissolved in the liquid propane is then passed into a chiller where the temperature of the mixture is gradually reduced to approximately −40° F. by the evaporation of a part of the propane under reduced pressure. The vaporized propane may be reliquefied by compression and cooling. When the oil and propane has been chilled to the dewaxing temperature of about −40° F., the mixture is pumped under pressure via line 8 into the filter chamber 1 and sprayed through spray head 10. The solution and precipitated wax will completely fill the chamber, after which the further introduction of chilled mixture under pressure will force propane and oil through the filter elements or canvas cloths 19 through the finer screens 18 into the space between the finer screens. The filtrate then trickles down the coarser screens 17 into filtrate collectors 22 through openings 19 and is then forced up through the vertical pipe 26 to discharge pipe 5 and manifold 7 from which it passes to an evaporator for separating the propane from the oil.

The filtration is continued until a wax cake of about one-half inch to one inch is built on the leaves at which time the flow of chilled mixture containing the precipitated wax is stopped by closing the inlet valve 8 and opening the drain valve 15 to drain out all liquid in the filter shell. Valve 15 is then closed and valve 12 is opened to permit the introduction of propane gas into the filter shell. Propane gas is then blown via line 11 through the wax cake at a pressure of approximately 10 to 20 lbs. per square inch and the blowing is continued for approximately one or two minutes. This operation will partially dry the wax cake. The pressure is then gradually raised by further opening of valve 12 until a pressure of about 100 lbs. per square inch is reached on the filter shell and the blowing is continued at this pressure for a length of time necessary to give the maximum degree of washing. As stated previously, the washing will be effected by condensation of propane on the wax cake due to the high pressure in the chamber. The blowing with the propane gas at the high pressure is usually continued for about 10 to 15 minutes. Any filtrate passed through the filter leaves resulting by the blowing operation will collect in filtrate collector 22 and will be removed via lines 26, 5, and manifold 7.

Upon completion of the blowing operation, the flow of propane gas through line 11 is discontinued and then the filter cake is removed from the filter leaves. In order to accomplish the latter, a reversed flow of propane may be resorted to. This is accomplished by closing valves 8, 12, and 15 and opening valves 6. Propane gas pressure and vacuum are then alternately introduced through the manifold 7 and pass through lines 5, pipes 26, filtrate collectors 22 and then through openings 25, and up through the coarse screen 17 through finer screen 18 and to the canvas cloths 19. The alternate bulging and contraction of the canvas frees the wax cake from the filter cloth and the dislodged wax will drop to the bottom of the filter chamber from which it may be removed by opening valve 31.

However, quite often all of the filter cake will not drop to the bottom of the filter shell. An accumulation of the wax cake is jammed at the bottom of the filter leaves between adjacent filtering elements due to the close spacing of the filter leaves. Furthermore, in some instances, the wax cakes between adjacent filtering elements bridge over so that it is difficult to remove the wax cake off the filtering elements by flopping of the leaves. Such condition would, of course, hamper subsequent filtration of further quantities of chilled propane, oil and precipitated wax. In order to obviate this condition, I have provided a means for washing the accumulated wax cake. By positioning the openings 10a of the spray head 10 directly over the spaces between filter leaves, I am enabled to wash this accumulated wax to the bottom of the filter shell 1 when the filtering operation is resumed. The mixture of chilled propane, oil and precipitated wax will effectively throw the wax to the bottom of the shell when introduced under pressure through the spray head openings. The wax slurry containing oil and propane withdrawn from the bottom of the filter shell may be passed to a surge tank from which it may be returned to line 8 to be refiltered.

While I have described a preferred embodiment of my invention, it will be understood that this description is not to be considered as limiting as many variations may be made by those skilled in the art without departing from the spirit of my invention. For example, the invention is not to be construed as limiting an operation in a filter since it is obvious to those skilled in the art that the oil contained in the wax separated from chilled solutions containing precipitated wax by such means as settling or centrifuging may likewise be separated by blowing with gas at gradually increasing pressures as described above. Furthermore, it will be observed that condensable hydrocarbon or nonhydrocarbon gases, other than propane, may be employed for the blowing operation, such as, for example, butane, iso-butane, butylene, ethane, ethylene, propylene, carbon dioxide, sulfur dioxide, methyl chloride, etc.

I claim:

1. A process for separating precipitated wax from a solution of oil containing the same which comprises filtering a solution of oil containing precipitated wax in a filter provided with adjacent filtering elements, dislodging the wax cake deposited on said filtering elements, spraying the solution containing precipitated wax between adjacent filtering elements contained in a closed chamber to remove wax contained on said filtering elements which was accumulated on said filtering elements from a previous filtering cycle, filling said chamber with said solution and subsequently forcing solution of oil through said filtering elements and depositing wax on the filtering elements.

2. A process for separating precipitated wax from a solution of oil containing the same which comprises passing said mixture into a filter provided with filtering elements and a space below said filtering elements and depositing wax on the filtering elements of said filter, discontinuing said passage of said mixture to said filter, dislodging wax deposited on said filtering elements and introducing further quantities of solution containing precipitated wax in a free falling stream in the spaces between adjacent filtering elements whereby dislodged wax accumulating between said spaces is caused to fall into the space in said filter below said filtering elements.

3. A process for separating precipitated wax from a solution of oil containing the same which comprises passing said mixture into a filter provided with filtering elements and a space below said filtering elements and depositing wax on the filtering elements of said filter, discontinuing said passage of said mixture to said filter, withdrawing unfiltered solution from said filter, dislodging wax deposited on said filtering elements and introducing further quantities of solution containing precipitated wax in a free falling stream in the spaces between adjacent filtering elements whereby dislodged wax accumulating between said spaces is caused to fall into the space in said filter below said filtering elements.

4. A process for separating precipitated wax from a solution of oil containing the same which comprises passing said mixture into a filter provided with filtering elements and a space below said filtering elements and depositing wax on the filtering elements of said filter, discontinuing the said passage of said mixture to said filter, withdrawing unfiltered solution from said filter, dislodging wax deposited on said filtering elements by alternate bulging and contraction of said filtering elements and introducing further quantities of solution containing precipitated wax in a free falling stream in the spaces between adjacent filtering elements whereby dislodged wax accumulating between said spaces is caused to fall into the space in said filter below said filtering elements.

5. A process for separating precipitated wax from a solution of oil containing the same which comprises passing said mixture into a filter provided with filtering elements and a space below said filtering elements and depositing wax on the filtering elements of said filter, discontinuing the said passage of said mixture to said filter, withdrawing unfiltered solution from said filter, dislodging wax deposited on said filtering elements by alternate bulging and contraction of said filtering elements, said alternate bulging and contraction of said filtering elements being accomplished by alternately applying gas pressure and releasing the same to the interior of said filtering elements and introducing further quantities of solution containing precipitated wax in a free-falling stream in the spaces between adjacent filtering elements whereby dislodged wax accumulating between said spaces is caused to fall into the space in said filter below said filtering elements.

6. An apparatus for separating solidified wax from a mixture containing the same which comprises a chamber, a plurality of filtering elements in said chamber, said filtering elements being adjacent to each other and sufficiently closely spaced to each other so that appreciable deposits of wax thereon result in a bridging of wax from one filtering element to the adjacent filtering element and means between and adjacent the upper part of said filtering elements for introducing a wax mixture to be filtered into said chamber, in a free falling stream between said filtering elements.

7. An apparatus for separating solidified wax from a mixture containing the same which comprises a chamber, a plurality of filtering elements in said chamber, said filtering elements being adjacent to each other and sufficiently closely spaced to each other so that bulging of the filtering elements in order to remove accumulated deposits of wax on said filtering elements results in a bridging of wax from one filtering element to the adjacent filtering element and means between and adjacent the upper part of said filtering elements for introducing a wax mixture to be filtered into said chamber in a free falling stream between said filtering elements.

BASIL HOPPER.